J. H. WAGENHORST.
VEHICLE WHEEL RIM.
APPLICATION FILED DEC. 30, 1911.
1,136,983.
Patented Apr. 27, 1915.
5 SHEETS—SHEET 1.
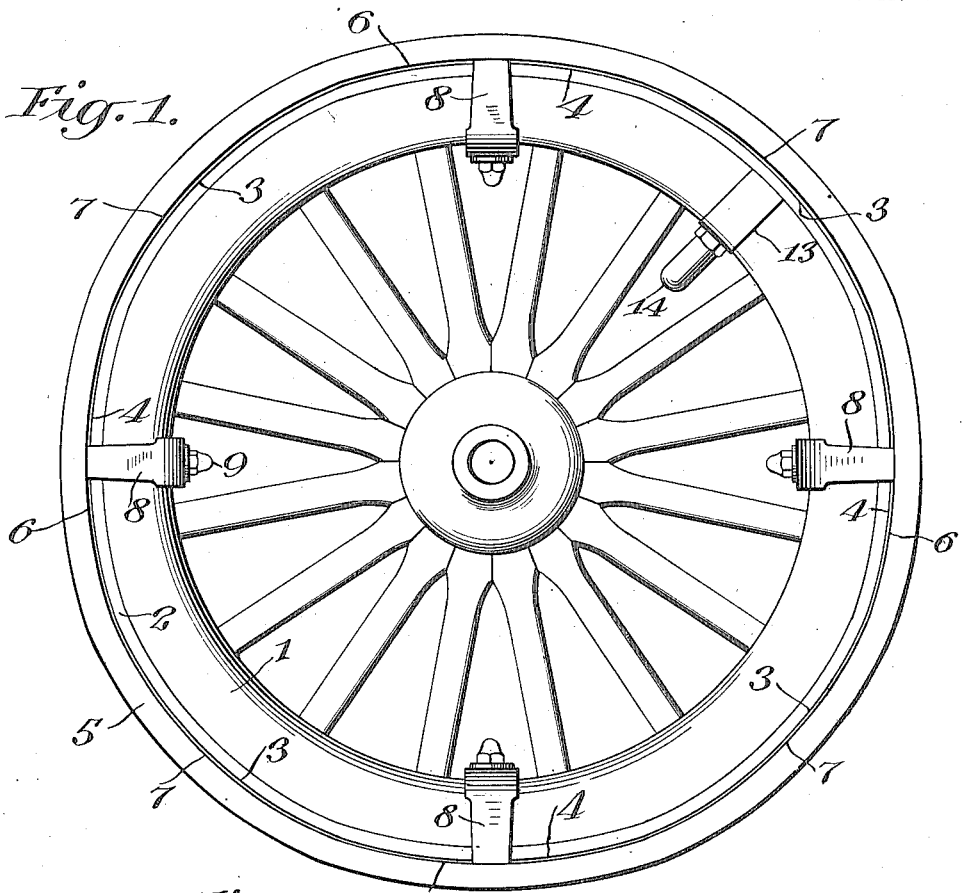
Fig. 1.
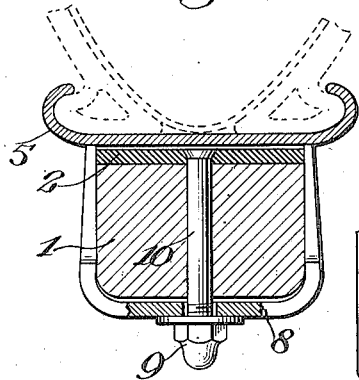
Fig. 2.
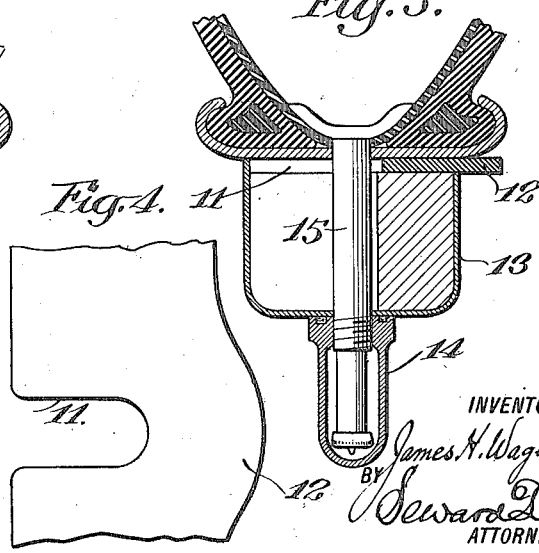
Fig. 3.
Fig. 4.
WITNESSES
H. Crocheron
Edmund Quincy Moses
INVENTOR
James H. Wagenhorst
BY Seward Davis
ATTORNEY

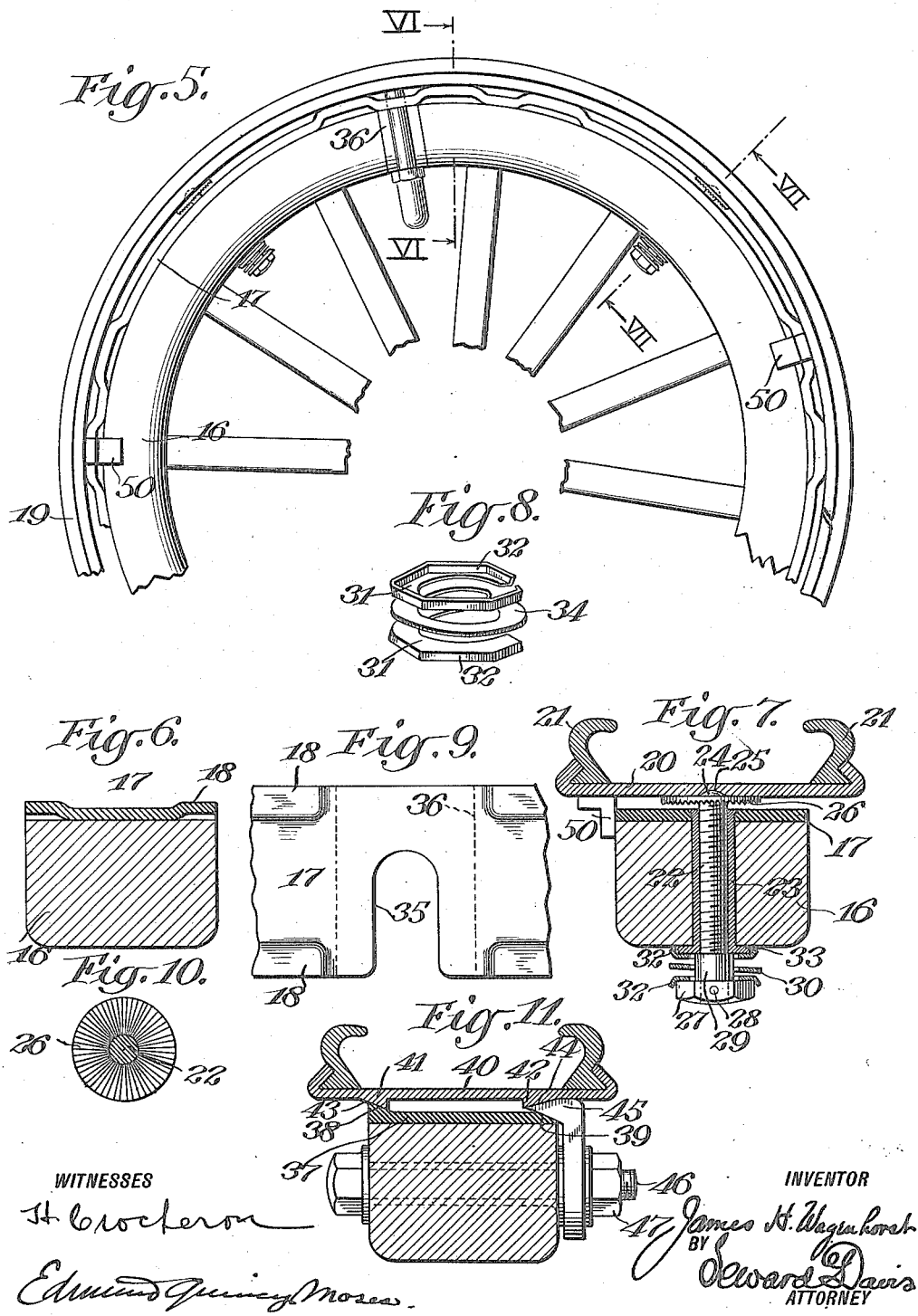

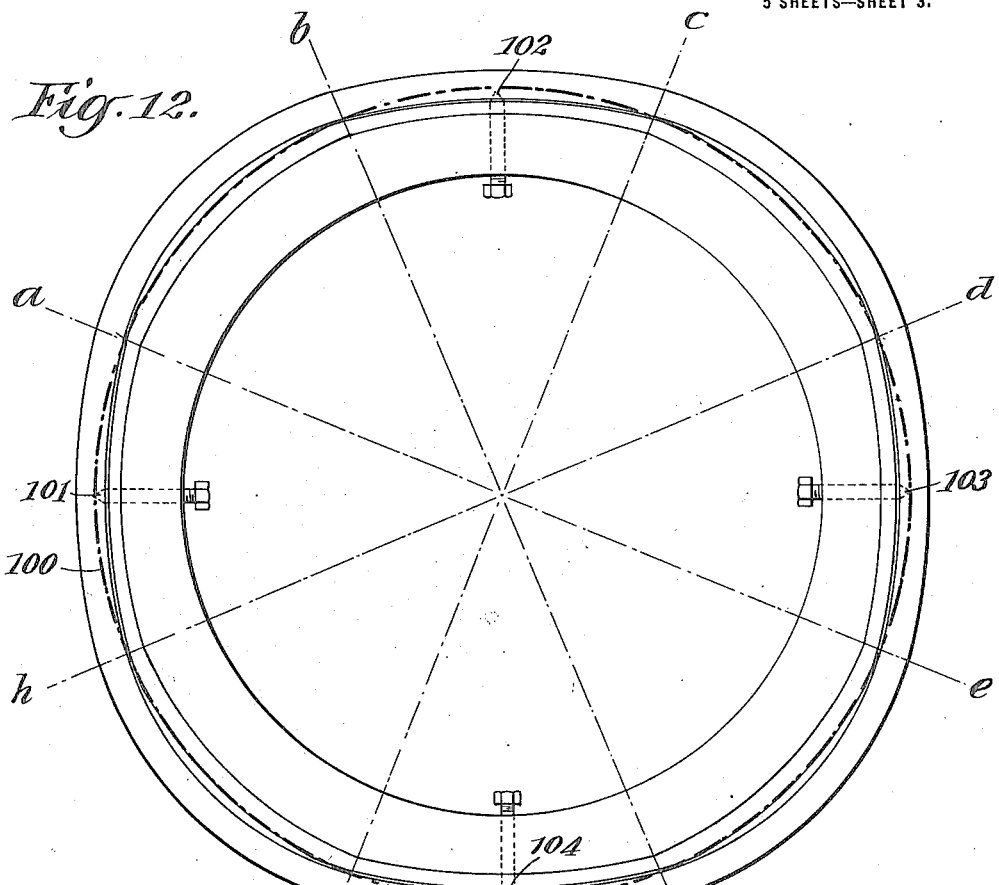
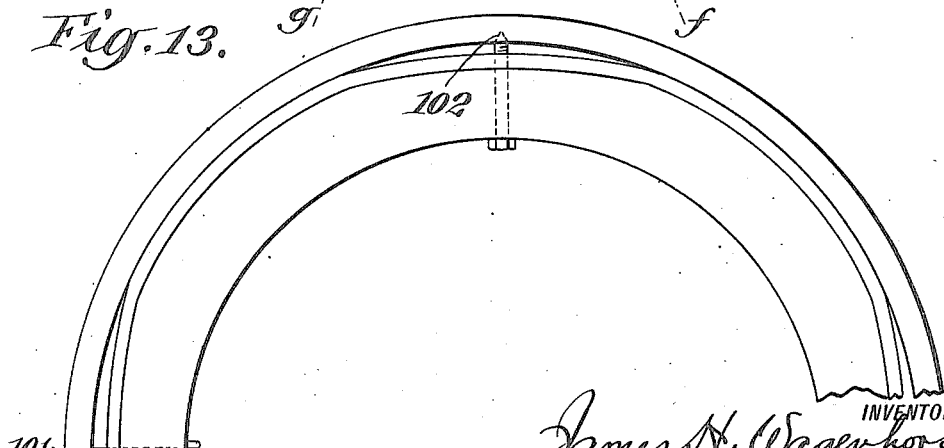

J. H. WAGENHORST.
VEHICLE WHEEL RIM.
APPLICATION FILED DEC. 30, 1911.
1,136,983.
Patented Apr. 27, 1915.
5 SHEETS—SHEET 4.
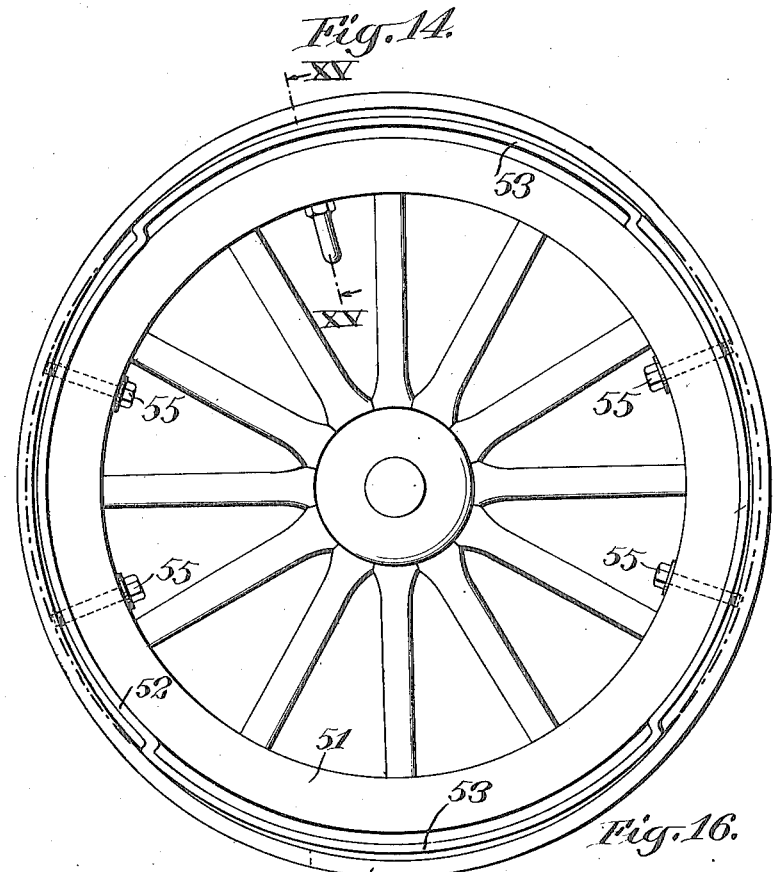
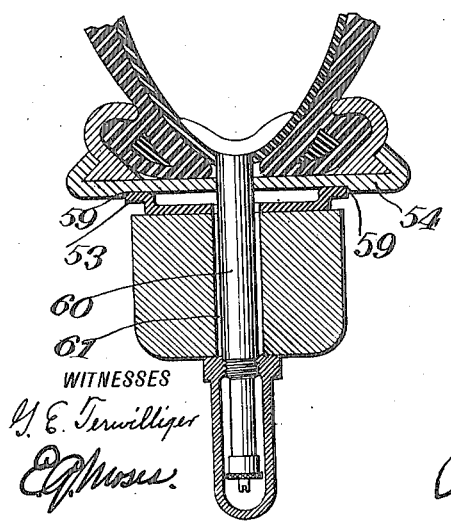
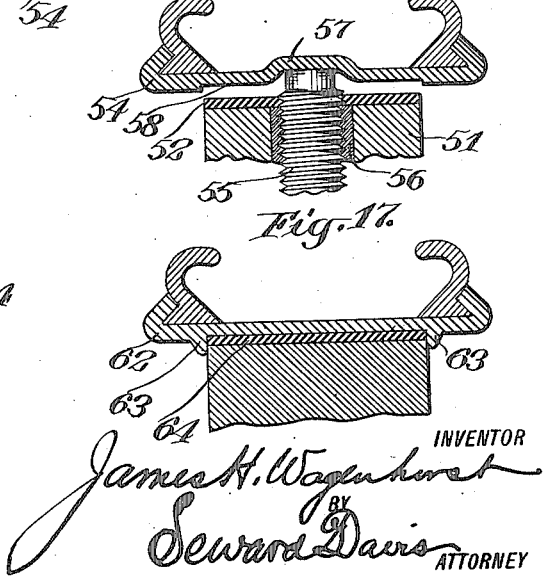
WITNESSES
INVENTOR
James H. Wagenhorst
BY
Seward Davis
ATTORNEY J. H. WAGENHORST.
VEHICLE WHEEL RIM.
APPLICATION FILED DEC. 30, 1911.
1,136,983.
Patented Apr. 27, 1915.
5 SHEETS—SHEET 5.
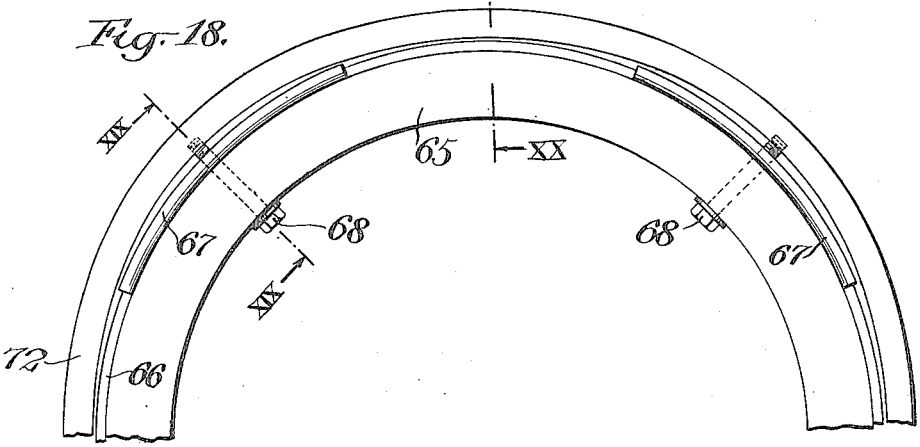
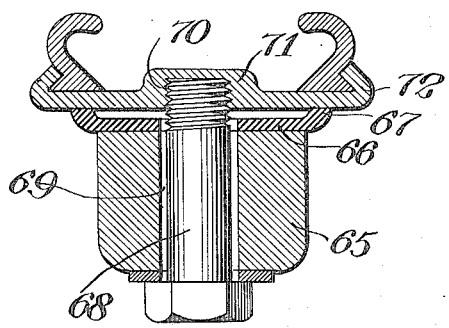
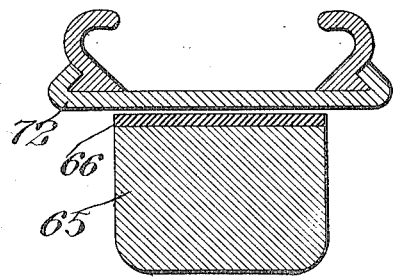
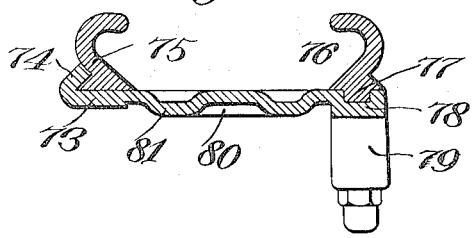
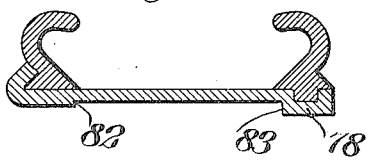
WITNESSES
Gerald E. Terwilliger
Edmund Quincy Moses
James H. Wagenhorst INVENTOR
BY
Seward Davis
ATTORNEY

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,136,983.      Specification of Letters Patent.      Patented Apr. 27, 1915.

Application filed December 30, 1911. Serial No. 668,771.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to rims for vehicle wheels of the type adapted to carry a pneumatic or other resilient tire and to be detachably mounted upon the vehicle wheel. Rims of this type are commonly known as demountable rims and their object is primarily to permit inflated tires to be carried upon extra rims ready to be applied to the vehicle wheels in case of emergency.

My present invention comprehends what I believe to be a radically new means and method of securing demountable rims upon vehicle wheels.

In accordance with this invention, the wheel, preferably provided with a suitable felly band, is formed with an irregular, that is, non-circular, periphery. The wheel periphery is depressed or flattened at intervals to a diameter smaller than its normal diameter and smaller than the diameter of the rim which is to be fitted to the wheel. The rim is also initially shaped to an irregular configuration, it being flattened at intervals corresponding to the flattened portions of the wheel. The circumferential length of the inner surface of the rim is equal to the circumference of a circle, the diameter of which is the maximum diameter of those portions of the wheel periphery which are not depressed or flattened. In attaching the rim to the wheel its inner surface is brought to approximately the configuration of a circle having this diameter, as will be hereinafter explained. The effect of flattening the rim at intervals is to increase its diameter between the points at which it is flattened out, and it thus assumes a configuration corresponding more or less closely to the configuration of the wheel periphery, but of slightly greater diameter at all points. It is thus possible to slip the rim freely into position upon the wheel felly. In order to secure the rim in such position, it is only necessary to force the flattened or depressed portions of the rim outwardly in order to give the rim a circular conformation. This will have the effect of decreasing the diameter of the rim at those points where its diameter was formerly greater than the diameter of the circular portions of the wheel periphery, thus bringing the rim into contact with such portions of the periphery. The rim can thus be readily caused to clamp itself upon the felly with a pressure amply sufficient to retain the same firmly in position. It will be seen that when the rim is thus locked in position upon the wheel it will be substantially circular in outline, so that no deterioration in the running qualities of the wheel will result from the making of the felly irregular. To detach the rim from the wheel it is merely necessary to release the pressure upon the flattened portions of the rim, which will permit the natural resiliency of the rim to restore the same to its initial irregular conformation. The rim is then free to be removed laterally from the wheel.

My invention also contemplates certain improvements in details of structure, as will be hereinafter fully set forth.

In the accompanying drawings, which form a part of this specification, Figure 1 is a side elevation of a wheel provided with a rim illustrating one embodiment of my invention; Fig. 2 is a transverse section through the rim and wheel felly showing one of the expanding yokes; Fig. 3 is a transverse section through the rim, felly band and felly at the valve-stem; Fig. 4 is a plan view of the portion of the felly band at the valve-stem, showing the same cut out to receive the latter and illustrating an improved reinforcement of the same; Fig. 5 is a view similar to Fig. 1 of a portion of a wheel provided with a modified form of my novel rim; Fig. 6 is a transverse section of the wheel felly and felly band taken on line VI—VI of Fig. 5; Fig. 7 is a transverse section through the rim, felly band and felly taken on the line VII—VII of Fig. 5; Fig. 8 is a perspective view of an improved form of spring lock-washer; Fig. 9 is a plan view of the portion of the felly band at the valve-stem illustrating a modified form of reinforcement for the same; Fig. 10 is a plan view of the under-side of the head of the wedging screw shown in Fig. 7; Fig. 11 is a transverse section through a rim, felly band and felly illustrating a modified form of my invention; Figs. 12 and 13 are diagrammatic views illustrating the operation of my rim, Fig. 12 showing the rim surrounding the wheel felly, but before being distorted to clamp the same, while Fig. 13 shows the rim clamped upon the felly; Fig. 14 is a side elevation of a wheel having a felly band provided with two raised circular portions alternating with two depressed portions and showing the rim placed thereon before being expanded into clamping engagement therewith; Fig. 15 is a section on line XV—XV of Fig. 14; Fig. 16 is a fragmentary sectional view through the rim, felly band and part of the felly taken at one of the expanding screws; Fig. 17 is a transverse section through a rim, felly band and portion of a felly showing a modified section of rim; Fig. 18 is a side elevation of a portion of a wheel-felly and rim illustrating a modified means for bringing the rim into engagement with the felly band; Fig. 19 is a section on line XIX—XIX of Fig. 18; Fig. 20 is a section on line XX—XX of Fig. 18; Figs. 21 and 22 are transverse sections through different portions of a modified form of tire-carrying rim.

Referring to the drawings in detail, and particularly to Figs. 1, 2, 3, 4, 12 and 13, 1 is the wheel felly to which may be secured by shrinking or otherwise the felly band 2. Parts of the periphery of the felly band are circular, for example, the parts designated 3 in Fig. 1, while the intermediate portions of the periphery indicated at 4 are depressed or flattened. Referring to the diagram Fig. 12, the portions of the wheel periphery between the radii $a$ and $b$, $c$ and $d$, $e$ and $f$, and $g$ and $h$, lie in the circumference of the dotted circle 100, while the intermediate portions of the periphery, namely, those between the radii $b$ and $c$, $d$ and $e$, $f$ and $g$, and $h$ and $a$, are flattened or depressed below this circle. It will be seen that the length of the periphery of the felly band is somewhat less than the length of the circumference 100. In the form of my invention illustrated in Fig. 1, this depression is accomplished by flattening the wheel felly before the felly band is applied and fitting the latter closely upon the felly. The rim 5, which may be of any suitable shape and construction, it being shown for the purposes of illustration as a standard clencher rim, is given initially an irregular configuration corresponding more or less closely to the irregular configuration of the wheel periphery. As shown in Fig. 1, it is flattened at the points 6 to a diameter less than the diameter of the portions 3 of the felly band periphery, this flattening resulting in the enlargement of its diameter at the point 7 to an extent sufficient to permit these portions of the rim to pass freely over the portions 3 of the felly band. The peripheral length of the inner surface of the rim is equal to the circumferential length of a circle having the diameter of the circular parts 3 of the felly band. Referring again to the diagram Fig. 12, it will be seen that the parts of the rim between the radii $b$ and $c$, $d$ and $e$, $f$ and $g$, and $h$ and $a$ are flattened or depressed until the inner surfaces of these portions of the rim lie within the circumference 100. As the length of the inner surface of the rim is equal to the length of the circumference 100, it will be seen that by thus depressing portions of the rim to positions inside of the circumference 100, the intermediate portions of the rim will be expanded in diameter to positions outside of the circumference 100. As thus shown in both Figs. 1 and 12, the inner diameter of the rim exceeds the outer diameter of the felly band at all points, and the rim consequently can be placed in position upon the felly without difficulty.

In order to clamp the rim in position upon the felly band, I provide means for expanding or forcing out the depressed or flattened portions of the same, and thus cause the intermediate portions 7, which were formerly of greater diameter than the corresponding portions of the felly band, to be contracted until the felly band is tightly gripped. Referring to Fig. 12, it will be seen that this will be accomplished when the depressed portions of the rim are forced outward until they approximately coincide with the circumference 100. As the peripheral length of the inner surface of the rim is equal to the circumference 100, this will cause the rim to assume a substantially circular configuration throughout, its inner surface coinciding at all points with the circumference 100. The portions of the rim and felly between the radii $a$ and $b$, $c$ and $d$, $e$ and $f$, and $g$ and $h$ will thus be brought into contact, and the application of a moderate amount of pressure at the points 101, 102, 103 and 104 will be ample to cause the rim to grip the felly band so tightly as to absolutely prevent its displacement. The wheel with the rim clamped thereon by having its depressed portions forced out and the intermediate portions thus brought into contact with the circular portions of the wheel, as described, is illustrated in Fig. 13.

In Figs. 1 and 2 I have shown one of the numerous means which may be used to expand the depressed portions of the rim. As shown in these figures, I provide a plurality of yokes 8 embracing the felly, the arms of which extend radially outward along the sides of the felly and engage the inner surface of the rim. The yokes are forced outward by means of nuts 9 engaging the threaded ends of bolts 10, which are secured to the felly band and passed through the felly. The removal of the rim is accomplished by releasing the nuts 9, which permits the rim to push in the yokes 8 and resume its initial irregular configuration, which it at once does owing to its inherent resiliency. In some cases the clearance between the rim and felly may be sufficient to permit the valve-stem of the tire carried by the rim to be inserted through a radial hole through the felly and felly band by inclining the rim with relation to the plane of the wheel in a well understood manner. Such a construction is shown in Figs. 14 and 15. It is, however, not always feasible to apply the rim in that way, and while a short valve-stem may be used in some cases, such a construction is also subject to certain disadvantages. I prefer, therefore, to notch the felly and band, as shown in Figs. 3 and 4, so as to permit the valve-stem to be moved laterally into its recess when the rim is applied. The felly band, being cut part way across by the notch 11, is preferably reinforced at that point, and this I accomplish, as shown in Figs. 3 and 4, by providing the felly band with the lateral extension 12. This extension 12, lying in the same cylindrical surface as the felly band, affords the maximum resistance to the circumferential tensional stresses in the felly band which would otherwise tend to spread open the opening 11 and rupture the felly band at that point. In order that the felly band may be firmly shrunk upon the felly, it is important that it be reinforced in this or in some other equally effective manner. The opening in the felly for the valve-stem may be closed against the entrance of dust, mud and water in any suitable manner, as by means of the yoke-shaped cover 13 surrounding the felly and retained in position by the usual dust-cap 14 screwed upon the valve-stem 15.

In Figs. 5 to 10, inclusive, I show a modified form of my invention in which the felly band is shaped to provide raised and depressed portions without the necessity for working the wooden wheel felly to an irregular conformation, these figures also showing a preferred means for forcing out the depressed portions of the rim and a novel means for reinforcing the felly band and felly at the point where the valve-stem passes through the same. As shown in Figs. 5, 6 and 9, the felly 16, which is preferably of circular outline, has permanently mounted upon it a felly band 17. The latter is provided at intervals with raised portions 18, the outer faces of which lie in a preferably substantially cylindrical surface, the circumference of which corresponds with the circumference 100 of Fig. 12. These raised portions are preferably formed by striking up portions of the metal of the felly band, in which case they are located only along the edges of the felly band, as shown in Figs. 6 and 9, thus leaving the central portion of the felly band in continuous contact with the surface of the felly. This is necessary where the raised portions 18 are formed by striking up the metal without thickening the same, as otherwise the felly band could not be shrunk upon the felly, for the reason that the tension would flatten out the raised portions. It is to be understood that the raised portions may be formed in any other suitable manner than by striking up as described. A series or group of comparatively short raised portions 18 may be provided, as illustrated in Fig. 5, these groups being located at intervals about the circumference of the felly, though it is obvious that a single raised portion of a length approximating that of a group may be substituted for the latter without changing the operation. (See Figs. 14 and 15.) The rim 19 is given an initial irregular configuration, it being flattened or depressed between the groups of raised portions 18 and correspondingly increased in diameter opposite the groups of raised portions. It may thus be placed in position upon the felly band and clamped thereto by expanding its depressed portions, as in the form of my invention already described. The rim may be of any suitable construction, for example, it may be formed of a transversely split rim base 20 provided with endless tire-retaining flanges 21. I do not claim this construction of flanges shown broadly, as the same forms the subject of my application Serial Number 639,953, filed July 22, 1911. Where I use a rim of this character, or any rim provided with removable tire-retaining flanges, the flanges may be either circular or initially shaped to conform to the configuration of the non-circular rim base. I prefer the latter construction, as the resiliency of the flanges, causing them to tend to resume their non-circular configuration when the rim expanding means are released, is thus added to the resiliency of the rim base for producing a releasing of the grip of the rim upon the felly, while if the flanges are of initial circular configuration, they tend to resist the resilient action of the rim.

For forcing out the depressed portions of the rim, I may use any suitable means, such for example as that shown in Figs. 1 and 2, but I prefer to use one or more radially disposed screws of the type illustrated in Figs. 5 and 7, located in position to act upon each of the depressed portions. These screws 22 pass radially through the felly band and engage with internally threaded nuts, sleeves or bushings 23 carried by the felly. The ends of the screws 24 preferably project into shallow recesses 25 formed in the inner surface of the rim, and thus when forced into engagement with the rim they act to positively prevent lateral movement of the latter. The screws are also preferably, but not necessarily, provided with enlarged heads 26, which seat within the rim and serve to distribute the pressure exerted upon the rim by the screws, so as to prevent the latter from simply denting or bending out a small area of the rim base. The lower faces of these heads 26 may be corrugated, as shown in Figs. 7 and 10, in order to clear out any dirt which may have accumulated beneath them, so as to permit the screws to be wholly withdrawn. The corrugated surface of the head acts to grind and clear out the dirt when the head and screw are rotated in withdrawing the screw. For withdrawing the screws 22, each is provided with a nut-head 27 permanently secured thereto in any suitable manner, as by means of a pin 28. The nut-head 27 is provided with a neck 29 adapted to engage with the end of the bushing 23 when the screw 22 is screwed through the felly to operative position, the end of this neck jamming against the end of the bushing and serving to prevent the screw from working loose. The screw will also be held to some extent by the pressure of the rim base 20 upon its head, this pressure being continuous owing to the resiliency of the rim. This action may be sufficient to prevent the screw from working loose, but in order to eliminate the possibility of a loosening of the screws, I prefer to use a suitable lock-washer engaging the nut-head 27.

In Figs. 7 and 8 I have shown an improved form of lock-washer 30 which is particularly adapted to the purpose in hand. This washer comprises end portions 31 provided with flanges 32 extending in opposite directions and forming substantially cup-shaped portions at each end of the washer so shaped as to receive the faceted nut-head 27 and a flange 33 formed on the end of the bushing 23, and preferably similarly faceted. In the form shown in the drawings the nut-head and flange 33 are both hexagonal. The flanged portions 31 at the ends of the washer are connected by a spring portion 34, preferably in the form of a helix having at least one complete convolution. The helix should be sufficiently long to allow ample spring between the two portions 31 and be capable of holding said flanged portions apart and in engagement with the flange 33 and head 27 when the screw and head 27 are withdrawn to the limit of their movement. The lock-washer will thus serve to hold the screw 22 in withdrawn as well as in operative position. The flanges 32 are preferably not at right angles with the flat parts of the ends 31, but flare outwardly, as shown most clearly in Fig. 7. When so formed the rotation of the nut-head 27 will cause corners of the nut facets to ride up the inclined flanges 32 and thus force the portions 31 of the washer together, compressing the spring portion 34. The nut-head can thus be rotated in either direction, automatically releasing itself from the lock-washer during rotation, but being immediately seized by the latter on being turned into a position in which its facets are parallel with the sides of the flange 32. It will thus be possible to lock the nut-head 27 and the screw 22 in any one of six positions, if the nut-head be hexagonal. In order to facilitate the application of the rim to the felly and insure its proper location thereon laterally of the felly, I preferably provide the rim with one or more lugs or stops 50 projecting from the inner surface of the rim and adapted to engage the side of the felly to limit the lateral movement of the same.

I have shown in Figs. 5 and 9 a construction for reinforcing the felly and felly band at the point where the latter are notched to receive the valve-stem. The felly band is notched at 35 for this purpose and has secured to its under-surface, preferably by welding, a block of metal 36, which is provided with a notch or groove of the same cross section as the notch 35 in the felly band. This block 36 extends entirely across the felly, which is cut out to receive it, the ends of the wooden felly abutting against the sides of this block. This block is amply strong to reinforce the felly band where it is notched and to permit the same to be shrunk firmly upon the felly. The shrinking of the felly band upon the felly draws the ends of the latter firmly against the sides of the block 36. The application of a felly band provided with a reinforcing block of this nature to a felly in no way weakens the same and can be very readily accomplished, as it is simply necessary to saw a small piece out of the felly to receive the block, when the felly band can be shrunk on in the usual manner.

In Fig. 11 I have shown, for purposes of illustration, a modification of my invention illustrating a different way of expanding the depressed or flattened portions of the rim, namely, by the use of a wedge forced laterally between the rim and felly band. According to the specific form shown in Fig. 11, those portions of the felly band 37 which are flattened or depressed below the normal level of the latter are provided with inclined faces 38 and 39, while the corresponding parts of the inner face of the rim base 40 are provided with ribs 41 and 42 provided with inclined faces 43 and 44. The inclined face 43 engages the inclined face 38 of the felly band, while between the inclined faces 44 and 39, which diverge, are interposed one or more wedges 45 which may be secured to the felly and drawn into wedging engagement between the inclined faces by any suitable means, as by means of the bolt 46 passing through the felly and carrying the nut 47. The screwing up of the nut 47 forces the wedge 45 between the faces 39 and 44, thus separating them and expanding the depressed or flattened portion of the rim, and at the same time moving the rim laterally to a limited extent, which causes the inclined face 43 to ride up on the inclined face 38, thus expanding the opposite side of the rim base. This structure is described simply to illustrate one of the many means which may be utilized to expand the depressed or flattened portions of the rim to cause the rim to grip the felly in the manner already fully set forth.

In Figs. 14, 15 and 16 another modification of my invention is shown. According to this modification, the wheel felly 51 is provided with a felly band 52, portions of which, 53, at the diametrically opposite sides of the felly circumference are raised to provide two raised concentric seats for the rim. The edge portions of the felly band only, are struck up to form the seats for the rim, the central portion of the felly band being left in contact with the felly throughout the circumference of the latter in order to provide for a firm seating of the felly band and to permit the same to be shrunk upon the felly in the usual manner. The rim 54, in order that it may be mounted upon this felly band is given a substantially elliptical configuration, which permits it to be readily moved into position. The depressed portions of the elliptical rim are then forced outward, thus lengthening the minor axis of the ellipse and shortening the major axis thereof, resulting in the clamping of the rim upon the raised portions 53 of the felly band. For forcing out the depressed portions of the rim I have shown a pair of radially disposed screws 55 for each depressed portion. It is obvious that a single screw may be used, as shown in Fig. 5, or that more than two screws, or any other suitable expanding means, may be used if desired. As shown in Fig. 16, the screws 55 screw through threaded bushings 56 carried by the felly, the ends of the screw being received in sockets 57 formed by offsetting the metal of the rim. As shown in Figs. 15 and 16, the under-surface of the rim is preferably channeled slightly, as indicated at 58, to receive the felly band, the walls of the channel forming shoulders 59 which engage the sides of the raised portions 53 of the felly band and serve to prevent the possibility of lateral displacement of the rim upon the wheel. With the rim shown in Figs. 14 and 15, the clearance is sufficient to permit the valve-stem 60 to be passed through a radial hole 61 in the felly, while inclined slightly to the plane of the wheel, the rim being then swung into position upon the felly in a well understood manner. It is to be understood, however, that I may provide a notch in the side of the felly, as indicated in Figs. 3 and 9, if desired. Also, it is possible with the rims shown in Figs. 1 and 5 to make the clearance between the rim and felly band such that the valve-stem may be passed through a radial hole, as shown in Fig. 15. Fig. 17 shows a modification of the rim shown in Figs. 15 and 16, the rim 62 being provided with inwardly projecting circumferential ribs or beads 63 which form between them a channel, corresponding to the channel 58, for the reception of the felly band 64.

Figs. 18, 19 and 20 show a modified form of my invention in which I provide means for drawing in the raised portions of the rim or portions of greatest diameter thereof in order to cause the rim to clamp the felly band, instead of securing this result by forcing out the depressed portions of the rim. These figures also illustrate a modified form of felly band. The felly 65 has mounted upon it the felly band 66, which seats firmly upon the same about its entire periphery. In order to provide the raised concentric seating surfaces for the rim, raised flanges 67 are formed upon the edges of the felly band, these flanges being spaced at intervals around the same. For drawing down the raised portions of the rim upon these flanges, I provide a number of bolts 68 which pass through openings 69 in the felly, the screw-threaded ends of the bolts being received in sockets 70 formed in bosses 71 projecting from the rim 72. Fig. 18 shows the rim in position upon the felly, but before being clamped thereon. The clamping is accomplished by screwing up the bolts 68, this operation drawing down the raised portions of the rim until they seat firmly upon the flanges 67, the depressed portions of the rim between the flanges being at the same time caused to draw away from the felly band so that the rim, when clamped upon the felly band, is substantially circular. As will be obvious, means such as shown in Fig. 5 for expanding the depressed portions of the rim may be used in conjunction with any of the bolts shown, if desired. The bolts 68 secure the rim in positive contact with the flanges 67 and prevent the lateral displacement of the rim.

Figs. 21 and 22 are sections of a modified form of rim in which the rim base 73 is endless, it being provided at one side with a flange 74 which engages and retains an endless, removable and reversible tire-retaining flange 75. The second tire-retaining flange 76 is made detachable, any of the well-known means for securing this flange upon the rim base being employed. For example, the flange 76 may be transversely split and provided with a rib 77 on its under-surface which seats within a channel 78 formed at the side of the rim base. The ends of the split flange 76 are locked together and to the rim base by any suitable means, such as by the locking device indicated diagrammatically at 79. This locking device is not illustrated in detail, as it may be of any well-known construction; for example, that shown in the patent to Bryant, No. 912,537. The rim base is provided with recessed seats 80, similar to the seat 57 shown in Fig. 16, for the reception of the ends of the screws used to force out the depressed portions of the rim. With a rim of the kind shown in Fig. 21, however, portions of the rim must be offset around the seat, as indicated at 81, in order to avoid having any portion of the rim project above the normal level of the surface of the rim base. It will be seen that the seat could not be formed as shown in Fig. 16, as it would be in that case impossible to remove the flange 75, as both the flange and the rim base are endless. The portions 81 of the rim base do not interfere with the proper seating of the latter upon the felly band, as these portions come opposite the depressed portions of the felly band. Fig. 22 shows the normal cross-section of the rim shown in Fig. 21. The central part of the under-side of the rim base may be channeled to provide a shoulder 82 to engage one side of the felly band, the inner wall 83 of the channel portion 78 of the rim base forming a shoulder to engage the other side of the felly band. The felly band will thus be gripped between these shoulders, as shown in Figs. 15 and 17, and lateral displacement of the rim prevented.

While the drawings show and the specification describes in detail certain preferred embodiments of my invention, these are intended to be merely illustrative of the many forms which my invention may take. For example, while the drawings show, in some of the figures, the felly and rim provided with four equally spaced depressed or flattened portions, separated by raised portions or portions of normal curvature, thus making the rim and felly in a sense octagonal, and in Fig. 14 show the rim and felly provided with two depressed portions, I do not desire to be limited to the use of either two or four depressed or flattened portions, as the rim and felly may be provided with one or any suitable number of flattened or depressed portions. The drawings necessarily show the irregularity of the felly and rim on a somewhat exaggerated scale, as the actual amount of depression may be very slight. For example, and without limiting myself to any particular dimensions, I may state that in rims which I have actually constructed the difference between the maximum and minimum diameters of the felly is about one-quarter of an inch. It is also to be understood that the rim need not be initially distorted out of circular configuration, as it may be normally circular, being temporarily forced into distorted position in any suitable manner long enough to permit it to be applied to the felly, when it may be released from the distorting force and permitted to assume its normal circular position under the influence of its own resiliency. It will thus clamp itself upon the wheel felly. I prefer, however, to set the rim in initially distorted position, as in such position it is easier to handle in applying the same to the wheel felly, and also when the means used to force it into circular position and clamp it upon the felly are released it will automatically resume its distorted or non-circular position and thus free itself from its clamping engagement with the felly.

I do not intend the claims hereto appended to be limited to the specific features of the described structures any further than said features are specifically enumerated in certain of the more limited claims, but intend to cover my invention and the application of the novel principle thereof broadly.

Having thus described my invention, I claim.

1. In combination with a vehicle wheel, an initially distorted rim, and means for changing the configuration of said rim without decreasing its peripheral length to cause it to clamp the periphery of said wheel.

2. In a vehicle wheel, in combination, a fixed wheel member having a periphery of non-circular outline, the portions thereof of greatest diameter forming bearing surfaces, a removable rim adapted to be applied thereto, and means for changing the outline of said rim after application to said fixed wheel member to cause the same to clamp itself upon the bearing surfaces of said fixed wheel member.

3. In a vehicle wheel, in combination, a fixed wheel member having a periphery of non-circular outline, and a removable rim adapted to be applied thereto while out of circular form, and means for forcing said rim into circular form after application to said wheel, whereby said rim will be caused to clamp itself upon said wheel.

4. In a vehicle wheel, in combination, a fixed wheel member having a periphery, a part of which is concentric with the axis of rotation of the wheel, and a part of which is depressed below said concentric portion, a rim adapted to be mounted upon said wheel while having a part of the same depressed, said depressed portion corresponding in location to the depressed portion of the fixed wheel member, and means for causing the said rim to assume substantially circular configuration after application to said fixed wheel member, whereby said rim is clamped upon the concentric portion of said fixed wheel member.

5. In a vehicle wheel, in combination, a fixed wheel member having a non-circular periphery, a rim initially distorted from a circular configuration and adapted to be laterally applied to said fixed wheel member, and means for changing the configuration of said rim without decreasing its peripheral length to cause the same to clamp said fixed wheel member.

6. In a vehicle wheel, in combination, a fixed wheel member having a periphery, parts of which are concentric with the axis of rotation of the wheel, said concentric parts being separated by depressed portions, a removable rim adapted to be applied to said felly while distorted at points corresponding in location to the depressed portions of the fixed wheel member, and means for forcing said distorted portions of said rim radially outward after the same has been mounted upon said fixed wheel member to cause the rim to clamp the concentric portions of said fixed wheel member.

7. In a vehicle wheel, in combination, a fixed wheel member having a periphery, parts of which are concentric with the axis of rotation of the wheel, said concentric parts being separated by depressed or flattened portions, a removable rim adapted to be applied to said fixed wheel member while distorted at points corresponding in location to the depressed or flattened portions of the fixed wheel member, and means carried by the fixed wheel member for forcing said depressed or flattened portions of said rim radially outward after the same has been mounted upon said fixed wheel member to cause the rim to clamp the concentric portions of said fixed wheel member.

8. In a vehicle wheel, in combination, a fixed wheel member having a periphery, parts of which are concentric with the axis of rotation of the wheel, said concentric parts being separated by depressed or flattened portions, an initially distorted removable rim adapted to be applied to said fixed wheel member while flattened or depressed at points corresponding in location to the depressed or flattened portions of the fixed wheel member, radially disposed screws carried by said fixed wheel member and engaging the inner surface of said rim for forcing said depressed or flattened portions of said rim radially outward after the same has been mounted upon said fixed wheel member to cause the rim to clamp the concentric portions of said fixed wheel member.

9. In a vehicle wheel, in combination, a fixed wheel member having a periphery, parts of which are concentric with the axis of rotation of the wheel, said concentric parts being separated by depressed or flattened portions, a removable rim adapted to be applied to said fixed wheel member, said rim being initially distorted out of circular configuration by having portions thereof depressed or flattened, said depressed or flattened portions of said rim corresponding in location to the depressed or flattened portions of the fixed wheel member, and means for forcing said depressed or flattened portions of said rim radially outward after the same has been mounted upon said fixed wheel member to cause the rim to clamp the concentric portions of said fixed wheel member.

10. In a vehicle wheel, in combination, a fixed wheel member having a periphery, parts of which are concentric with the axis of rotation of the wheel, said concentric parts being separated by depressed or flattened portions, a removable rim adapted to be applied to said fixed wheel member, said rim being initially distorted out of circular configuration by having portions thereof depressed or flattened, said depressed or flattened portions of said rim corresponding in location to the depressed or flattened portions of the fixed wheel member, and means for forcing said depressed or flattened portions of said rim radially outward after the same has been mounted upon said fixed wheel member to cause the rim to clamp the concentric portions of said fixed wheel member, said rim being sufficiently resilient to resume its initially distorted configuration when freed from the action of said means.

11. In a vehicle wheel, in combination, a wheel felly having a periphery of circular outline, a felly band mounted thereon having a non-circular outline, an initially distorted rim adapted to be mounted upon said felly band while thus distorted from a circular outline, and means for restoring said rim to a circular outline when mounted upon said felly band in order to cause said rim to clamp itself upon said felly band.

12. In a vehicle wheel, in combination, a felly having a circular outline, a felly band mounted thereon having portions raised therefrom, the surfaces of said raised portions lying in a circle concentric with the axis of rotation of the wheel, a rim having depressed portions located between successive raised portions of said felly band, the circumferential length of the inner surface of said rim being equal to the length of the circumference of the circle in which said raised portions of the felly band lie, and means for forcing the depressed portions of said rim radially outward when the same is mounted upon said felly band, whereby the rim is caused to clamp itself upon the raised portions of said felly band.

13. In a vehicle wheel, in combination, a felly having a circular outline, a felly band mounted thereon having portions raised therefrom, the surfaces of said raised portions lying in a circle concentric with the axis of rotation of the wheel, a rim having depressed portions located between successive raised portions of said felly band, the circumferential length of the inner surface of said rim being equal to the length of the circumference of the circle in which said raised portions of the felly band lie, and means for forcing the depressed portions of said rim radially outward when the same is mounted upon said felly band, whereby the rim is caused to clamp itself upon the raised portions of said felly band, said rim having sufficient resiliency to cause the same to return to its initially distorted position when the means for forcing out the depressed portions thereof are withdrawn.

14. In a vehicle wheel, in combination, a felly, a felly band mounted thereon having portions of its edges struck up at intervals to form raised portions, the outer surfaces of which lie in a circle concentric with the axis of rotation of the wheel, an initially distorted rim adapted to be mounted on said wheel and having depressed portions corresponding in location to the portions of said felly band between the raised portions thereof, and radially disposed screws carried by said felly engaging the inner surface of said rim, said screws being located adjacent to the depressed portions of the latter.

15. In a vehicle wheel, in combination, a fixed wheel member having a periphery, parts of which are concentric with the axis of rotation of the wheel, said concentric parts being separated by depressed portions, an initially distorted rim adapted to be mounted on said wheel and having depressed portions corresponding in location to the depressed or flattened portions of said felly band, and screws located adjacent to the depressed portions of said rim, said screws passing radially through the felly and having ends received in recesses formed in the inner surface of said rim.

16. In a vehicle wheel, in combination, a fixed wheel member having a periphery, parts of which are concentric with the axis of rotation of the wheel, said concentric parts being separated by depressed portions, an initially distorted rim adapted to be mounted on said wheel and having depressed portions corresponding in location to the depressed portions of said felly band, and screws located adjacent to the depressed portions of said rim, said screws passing radially through the felly and having enlarged heads seating within the inner surface of said rim.

17. In a vehicle wheel, in combination, a fixed wheel member having a periphery, parts of which are concentric with the axis of rotation of the wheel, said concentric parts being separated by depressed portions, an initially distorted rim adapted to be mounted on said wheel and having depressed portions corresponding in location to the depressed portions of said felly band, and screws located adjacent to the depressed portions of said rim, said screws passing radially through the felly and having enlarged heads seating within the inner surface of said rim, the inner surfaces of said heads being corrugated.

18. In a vehicle wheel, in combination, a fixed wheel member having an irregular periphery comprising portions concentric with the axis of rotation of the wheel and depressed portions, a tire-carrying rim adapted to be mounted thereon comprising a transversely split rim base carrying endless tire-retaining flanges, said rim base and flanges being initially distorted into an irregular configuration substantially corresponding with the configuration of the periphery of the fixed wheel member, and means for forcing the depressed portions of the rim radially outward when the same is mounted upon the fixed wheel member.

19. In a vehicle wheel, in combination, a felly, a felly band mounted thereon comprising a central portion seating upon the felly throughout its circumference, the edge portions of the felly band being offset to lie in surfaces parallel with the surface of the central part of the felly band, but outside of the same, and a demountable tire-carrying rim seating upon the outer surfaces of said offset portions.

20. In a vehicle wheel, a felly provided with a notch extending into one side thereof to receive the valve-stem of a tire, the felly being reinforced by means of a felly band surrounding the same, said felly band carrying a block of metal fitting between the ends of the wooden part of the felly, the valve-stem notch being formed in said block.

21. In a vehicle wheel, a felly provided with a notch extending into one side thereof, the felly being reinforced by means of a felly band surrounding the same, said felly band being notched and carrying, adjacent to said notch, a block of metal extending entirely across the felly and fitting between the ends of the wooden part thereof, the notch in the felly being formed in said block.

22. In a vehicle wheel, a felly, an initially distorted rim removably mounted thereon, and a set screw passing radially through said felly, said set screw having an enlarged head seating upon the inner surface of said rim and presenting a bearing surface on the inner face of the rim of sufficient size to distribute the pressure exerted by said screw.

23. In a vehicle wheel, a felly, a rim removably mounted thereon, and a set screw passing radially through said felly, said set screw having an enlarged head seating within the inner surface of said rim, the inner surface of said head being corrugated.

24. In a vehicle wheel a felly, a rim removably mounted thereon, a set screw passing radially through said felly and a lock washer for preventing the accidental rotation of said set screw comprising a helical spring, means for holding one end of said spring against accidental rotation, and a flanged cup formed at the other end of said spring, said cup being polygonal in shape to engage the faceted head of the nut.

25. In a vehicle wheel a felly, a rim removably mounted thereon, a set screw passing radially through said felly and a lock washer for preventing the accidental rotation of said set screw comprising a helical spring having at each end thereof a polygonal flanged cup-shaped portion, the flanges being outwardly flared.

JAMES H. WAGENHORST.

Witnesses:
D. W. COTTON,
HARRY O. WOLF.